United States Patent
Chen et al.

(10) Patent No.: US 9,110,320 B2
(45) Date of Patent: Aug. 18, 2015

(54) DISPLAY WITH BENT INACTIVE EDGE REGIONS

(75) Inventors: Cheng Chen, San Jose, CA (US); Shih-Chang Chang, Cupertino, CA (US); John Z. Zhong, Cupertino, CA (US); Wei Chen, Palo Alto, CA (US); Hao Zhang, Cupertino, CA (US); Sunggu Kang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 13/585,666

(22) Filed: Aug. 14, 2012

(65) Prior Publication Data

US 2014/0049500 A1    Feb. 20, 2014

(51) Int. Cl.
| | |
|---|---|
| G06F 3/045 | (2006.01) |
| G02F 1/1333 | (2006.01) |
| G02F 1/1335 | (2006.01) |
| G02F 1/1368 | (2006.01) |
| G06F 3/044 | (2006.01) |
| G06F 3/041 | (2006.01) |
| G02F 1/1345 | (2006.01) |

(52) U.S. Cl.
CPC ............ *G02F 1/1333* (2013.01); *G02F 1/1368* (2013.01); *G02F 1/133305* (2013.01); *G02F 1/133514* (2013.01); *G06F 3/044* (2013.01); *G06F 3/0412* (2013.01); *G02F 1/13452* (2013.01); *G02F 2001/133302* (2013.01); *G02F 2001/133388* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 4,066,855 A | 1/1978 | Zenk | |
| 4,085,302 A | 4/1978 | Zenk et al. | |
| 5,235,451 A | 8/1993 | Bryan | |
| 5,483,261 A | 1/1996 | Yasutake | |

(Continued)

FOREIGN PATENT DOCUMENTS

| | | |
|---|---|---|
| EP | 1038663 | 9/2000 |
| EP | 2187443 | 5/2010 |

(Continued)

OTHER PUBLICATIONS

Martisauskas et al., U.S. Appl. No. 13/229,120 filed Sep 9, 2011.

(Continued)

*Primary Examiner* — Christopher R Lamb
(74) *Attorney, Agent, or Firm* — Treyz Law Group; G. Victor Treyz; Kendall P. Woodruff

(57) ABSTRACT

An electronic device may be provided with a display having substrate layers such as a glass color filter layer substrate and a glass thin-film-transistor layer substrate. Display layers such as first and second layers of polymer, a liquid crystal layer interposed between the layers of polymer, color filter elements, and thin-film-transistor circuitry may be formed between the color filter layer substrate and the thin-film-transistor layer substrate. Flexible inactive portions of the display layers may protrude outward from between the color filter layer substrate and the thin-film-transistor substrate. Touch sensor circuitry may be formed from a flexible polymer substrate. The touch sensor circuitry may include conductive touch sensor lines and capacitive electrodes. Each conductive line may be coupled to only a single end of a respective one of the capacitive electrodes.

14 Claims, 8 Drawing Sheets

(56) References Cited

U.S. PATENT DOCUMENTS

| | | | |
|---|---|---|---|
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,956,633 | B2 | 10/2005 | Okada et al. |
| 7,015,894 | B2 | 3/2006 | Morohoshi |
| 7,034,913 | B2 | 4/2006 | Ishida |
| 7,184,064 | B2 | 2/2007 | Zimmerman et al. |
| 7,453,542 | B2 | 11/2008 | Muramatsu et al. |
| 7,541,671 | B2 | 6/2009 | Foust et al. |
| 7,593,086 | B2 | 9/2009 | Jeong et al. |
| 7,593,087 | B2 | 9/2009 | Jang |
| 7,663,607 | B2 | 2/2010 | Hotelling et al. |
| 7,767,048 | B2 | 8/2010 | Kanbayashi |
| 7,787,917 | B2 | 8/2010 | Aoki et al. |
| 7,834,451 | B2 | 11/2010 | Lee et al. |
| 7,936,405 | B2 | 5/2011 | Kitagawa |
| 8,134,675 | B2 | 3/2012 | Kawaguchi et al. |
| 8,194,048 | B2 | 6/2012 | Oowaki |
| 2005/0285990 | A1 | 12/2005 | Havelka et al. |
| 2006/0026521 | A1 | 2/2006 | Hotelling et al. |
| 2006/0170634 | A1* | 8/2006 | Kwak et al. .............. 345/92 |
| 2006/0197753 | A1 | 9/2006 | Hotelling |
| 2006/0221269 | A1* | 10/2006 | Kawaguchi .............. 349/58 |
| 2007/0148831 | A1 | 6/2007 | Nagata et al. |
| 2008/0117376 | A1 | 5/2008 | Takenaka |
| 2009/0027896 | A1 | 1/2009 | Nishimura et al. |
| 2009/0167171 | A1 | 7/2009 | Jung et al. |
| 2009/0256471 | A1 | 10/2009 | Kim et al. |
| 2009/0284688 | A1 | 11/2009 | Shiraishi et al. |
| 2010/0007817 | A1 | 1/2010 | Kim |
| 2010/0026952 | A1 | 2/2010 | Miura et al. |
| 2010/0066724 | A1* | 3/2010 | Huh et al. ................ 345/213 |
| 2010/0208190 | A1 | 8/2010 | Yoshida |
| 2010/0225624 | A1 | 9/2010 | Fu et al. |
| 2010/0315399 | A1 | 12/2010 | Jacobson et al. |
| 2010/0328268 | A1* | 12/2010 | Teranishi et al. ............. 345/175 |
| 2011/0012845 | A1 | 1/2011 | Rothkopf et al. |
| 2011/0086680 | A1 | 4/2011 | Kim et al. |
| 2011/0227846 | A1 | 9/2011 | Imazeki |
| 2011/0285640 | A1* | 11/2011 | Park et al. ............. 345/173 |
| 2012/0062447 | A1 | 3/2012 | Tseng et al. |
| 2012/0127075 | A1* | 5/2012 | Kholaif ............. 345/161 |
| 2012/0127087 | A1 | 5/2012 | Ma |
| 2012/0190220 | A1* | 7/2012 | Lee et al. ............. 439/67 |
| 2012/0313859 | A1* | 12/2012 | Apgar et al. ............. 345/173 |
| 2013/0063891 | A1* | 3/2013 | Martisauskas ............. 361/679.56 |

FOREIGN PATENT DOCUMENTS

| | | |
|---|---|---|
| EP | 2523067 | 11/2012 |
| JP | 9321083 | 12/1997 |
| JP | 10115837 | 5/1998 |
| JP | 2000163031 | 6/2000 |
| JP | 2002342033 | 11/2002 |
| JP | 2010060866 | 3/2010 |
| JP | 2010060866 A | 3/2010 |
| WO | 9604682 | 2/1996 |
| WO | 0169577 | 9/2001 |
| WO | 2013036675 | 3/2013 |

OTHER PUBLICATIONS

Chen et al., U.S. Appl. No. 13/186,238, filed Jul. 19, 2011.
Drzaic et al., U.S. Appl. No. 13/252,971, filed Oct. 4, 2011.
Franklin et al., U.S. Appl. No. 13/250,227, filed Sep. 30, 2011.
Franklin et al., U.S. Appl. No. 13/250,666, filed Sep. 30, 2011.
Franklin et al., U.S. Appl. No. 13/310,409, filed Dec. 2, 2011.
Franklin et al., U.S. Appl. No. 13/422,724, filed Mar. 16, 2011.
Lynch, U.S. Appl. No. 13/184,303, filed Jul. 15, 2011.
Rothkopf et al., U.S. Appl. No. 13/177,165, filed Jul. 6, 2011.
Myers et al., U.S. Appl. No. 13/108,256, filed May 16, 2011.
Myers et al., U.S. Appl. No. 13/246,510, filed Sep. 27, 2011.
Park et al., U.S. Appl. No. 13/591,095, filed Feb. 28, 2011.
Rubine, D.H. (May 1992). "Combining gestures and direct manipulation," CHI 92, pp. 659-660.
Raff et al., U.S. Appl. No. 13/452,061, filed Apr. 20, 2012.
Rappoport et al., U.S. Appl. No. 13/249,734, filed Sep. 30, 2011.
Rappoport et al., U.S. Appl. No. 13/273,851, filed Oct. 14, 2011.
Rothkopf et al., U.S. Appl. No. 13/171,295, filed Jun. 28, 2011.
Rappoport et al., U.S. Appl. No. 13/036,944, filed Feb. 28, 2011.
Lee, S.K. et al., (Apr. 1985). "A multi-touch three dimensional touch-sensitive tablet," Proceedings of CHI: ACM Conference on Human Factors in Computing Systems, pp. 21-25.
Rubine, D.H., (Dec. 1991). "The automatic recognition of gestures," CMU-CS-91-202, Submitted in partial fulfillment of the requirements for the degree of doctor of philosophy in computer science at Carnegie Mellon University, 285 pages.
Westermand, W. (Spring 1999). "Hand tracking, finger identification, and chordic manipulation on a multi-touch surface," A dissertation submitted to the faculty of the University of Delaware in partial fulfillment of the requirements for the Degree of Doctor of Philosophy in Electrical Engineering, 364 pages.

\* cited by examiner

DISPLAY WITH BENT INACTIVE EDGE REGIONS

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders.

It would therefore be desirable to be able to provide improved displays for electronic devices.

SUMMARY

An electronic device may be provided with a display having a substrate layers such as a glass color filter layer substrate and a glass thin-film-transistor layer substrate. Display layers such as layers of polymer, a liquid crystal layer interposed between the layers of polymer, color filter elements, and thin-film-transistor circuitry may be formed between the color filter layer substrate and the thin-film-transistor layer substrate.

The display layers may include an active region that contains an array of display pixels formed from thin-film-transistors. Conductive lines such as gate lines and data lines may couple display driver circuitry to the display pixels. The display driver circuitry may include one or more display driver integrated circuits.

Flexible inactive portions of the display layers may protrude laterally outward from between the color filter layer substrate and the thin-film-transistor substrate. The flexible inactive portions of the display layers may be bent to form bent edge portions of the display layers. The display driver circuitry may be mounted in the inactive portions of the display layers or on a flexible printed circuit that is coupled to the inactive portions of the display layers. Gate driver thin-film-transistor circuitry may be formed on one or more inactive bent edges of the display layer.

The flexible inactive portions of the display layers may be bent along horizontal fold lines, vertical fold lines, and diagonal fold lines. The conductive lines that are used in routing signals on the display layers may include diagonal conductive line segments that run perpendicular to diagonal bends in the flexible display layers.

Touch sensor circuitry may be formed on a flexible polymer substrate. The touch sensor circuitry may overlap the display pixels in the active area of the display. Conductive capacitive touch sensor electrodes such as elongated indium tin oxide electrodes that extend from edge to edge in the touch sensor may be formed on the flexible polymer substrate. Conductive lines may be coupled to the elongated electrodes. Each conductive line may be coupled to only a single end of a respective one of the capacitive touch senor electrodes. The flexible touch sensor substrate may be folded along only a single edge of the touch sensor or on two or more edges.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
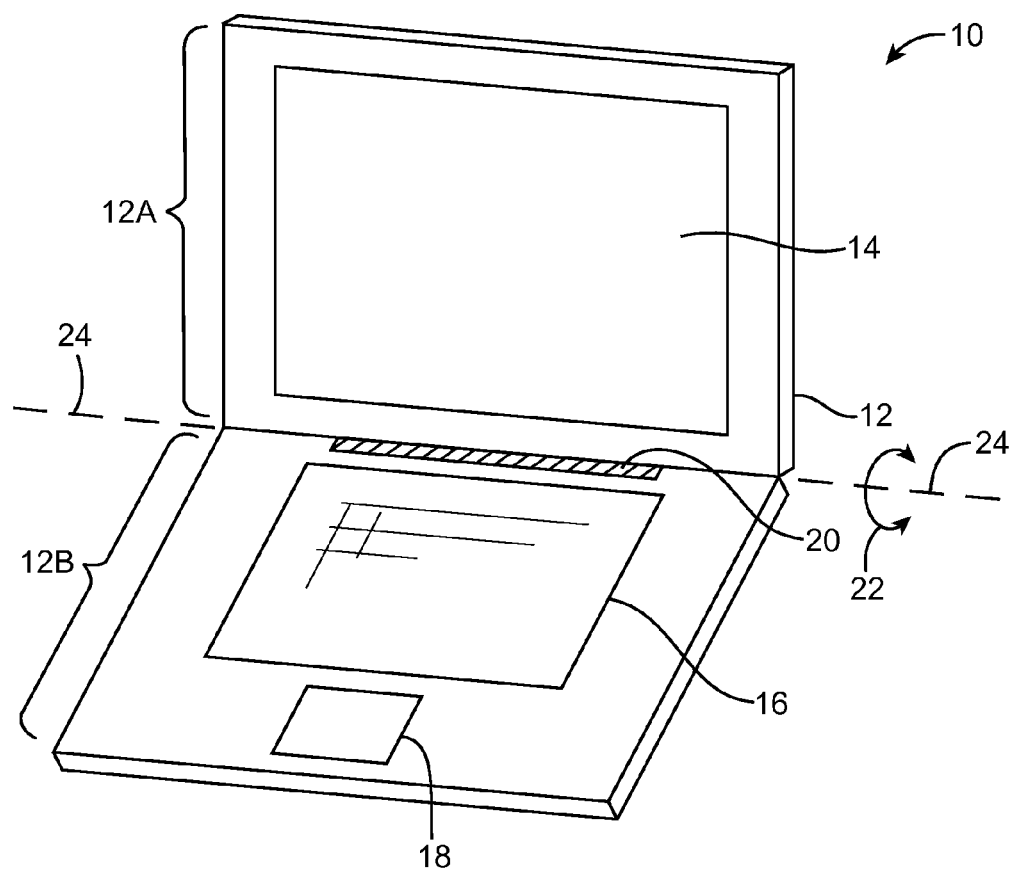
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
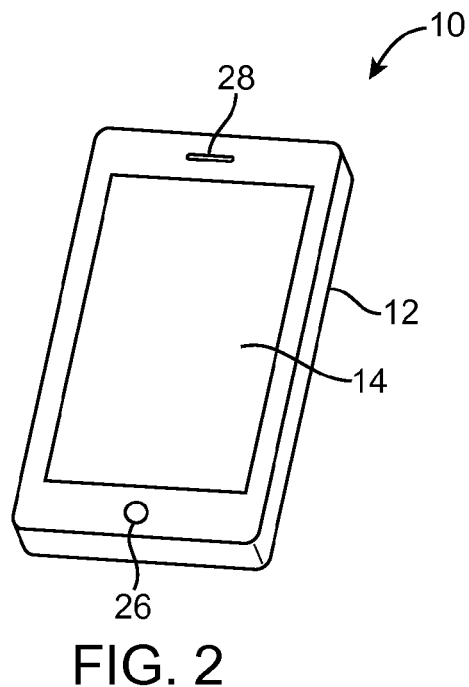
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
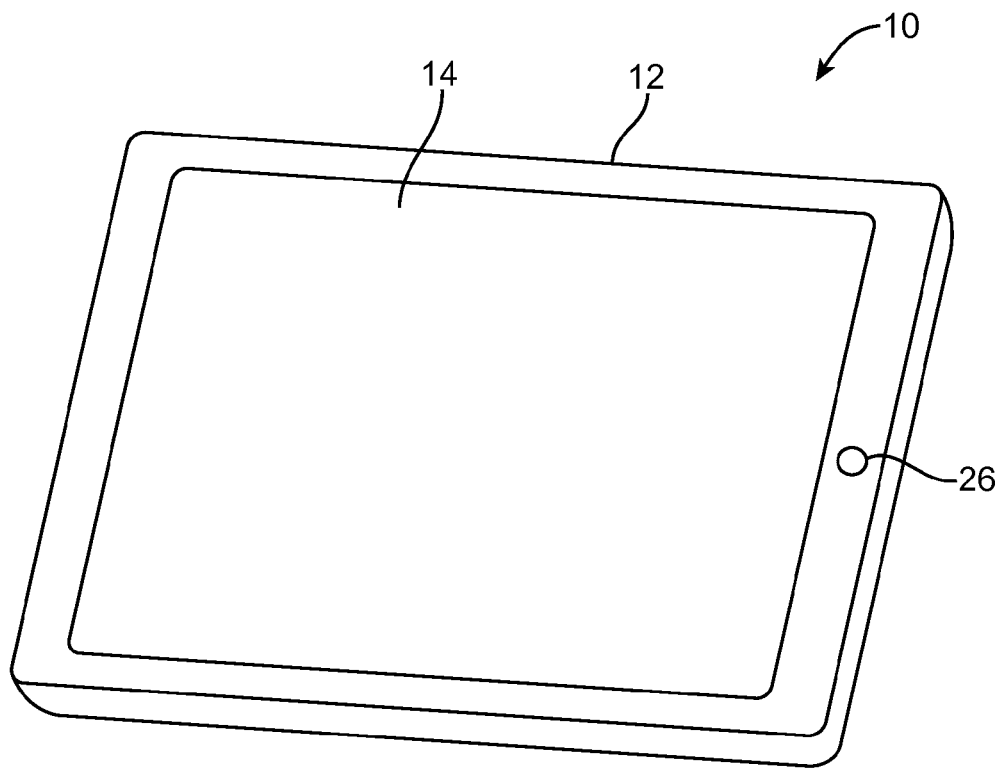
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer (e.g., a color filter layer or thin-film-transistor layer) with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components. Display 14 may have a rectangular shape or other suitable shapes. For example, display 14 may have a shape with upper and lower edges and right and left edges that is mounted within the front face of a housing structure for device 10 that has a rectangular front face or other housing structures with corresponding upper and lower sidewall edges and corresponding left and right sidewall edges.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer, thin-film transistor layer or other portion of a display may be used as the outermost (or nearly outermost) layer in display 14. For example, a color filter layer or thin-film transistor layer that is covered by a polarizer layer may form the outermost layer for device 10. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
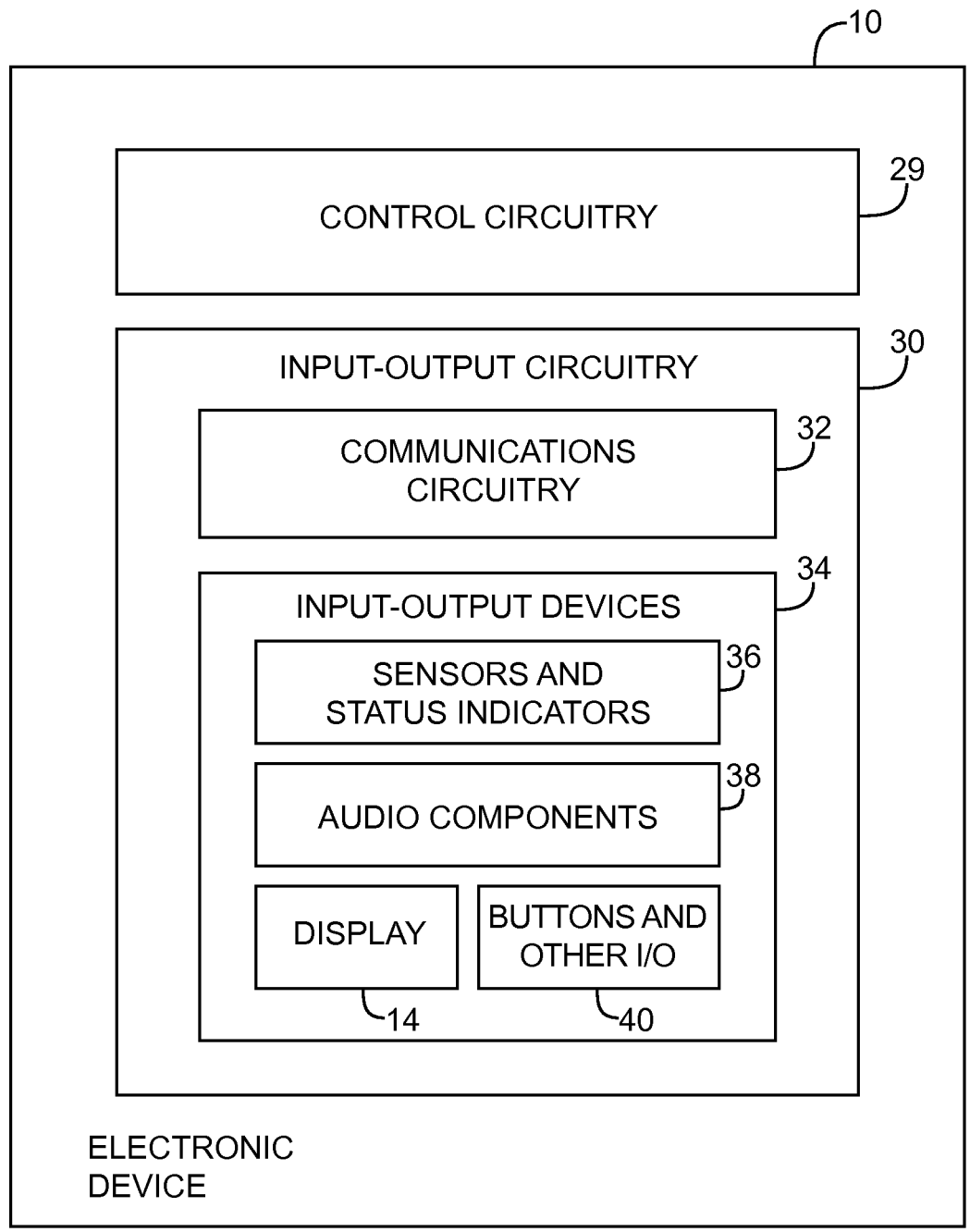
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
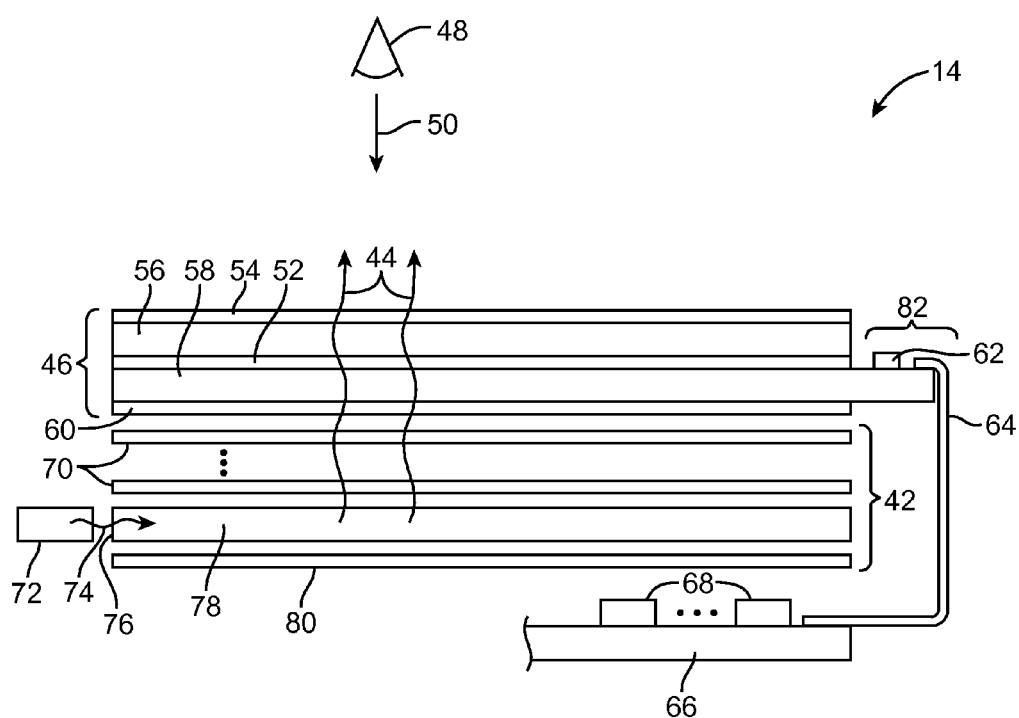
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, the positions of color filter layer 56 and thin-film-transistor layer 58 may be inverted so that the thin-film-transistor layer is located above the color filter layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint when viewed in direction 50 of FIG. 5 (i.e., when viewed as a top view), optical films 70 and reflector 80 may have a matching rectangular footprint.

Display 14 may be characterized by a central rectangular active area (sometimes referred to as active area AA) and may be characterized by an inactive border region (sometimes referred to as inactive area IA) that surrounds the periphery of the active area. In the active region, thin-film transistor layer 58 may contain an array of display pixels. Each display pixel may include electrode structures. Each display pixel may also include a thin-film transistor for controlling the amount of electric field that is applied to liquid crystal layer 52 by the electrode structures. Display 14 may include signal lines such as gate lines and data lines. During operation, gate line signals on the gate lines and data lines signals on the data lines may be provided to the array of display pixels. The gate line and data line signals may be used to control the display pixels and thereby display images on display 14 for viewer 48.

To accommodate display 14 within housing 12 of device 10 without creating excessively large inactive borders, it may be desirable to form one or more edges of display 14 (and, if desired, a touch sensor in display 14) using flexible layers of material. As an example, display 14 may be provided with one or more layers of flexible polymer sheets such as polyimide sheets or other polymer layers. These layers may be bent along the edges of display 14 so that some or all of the inactive surface area of display 14 is folded away from the exposed active area of the display.

For example, one or more strips of flexible inactive edge material in display 14 may be bent downwards at a right angle (or other suitable angle), thereby removing the flexible strips of material from the planar front face of the display. With the edges of the display folded out of the way, display 14 may have a borderless or nearly borderless appearance along one or more of its edges when viewed from the front by a user of device 10.

The central active area of the display may be formed from flexible display layers or may be formed from rigid structures. The use of rigid display structures such as structures that include one or more layers of glass substrate, may help improve display performance (e.g., by ensuring that the vertical separation between a thin-film-transistor layer and a color filter layer is accurately maintained at a desired value). To allow the edges of the display to bend, display 14 may be formed from a rigid substrate with flexible edges that extend laterally outwards from the rigid central display region. A display of this type may be formed by attaching rigid substrate structures to the central active portion of a flexible display or by otherwise rigidly supporting the central portion of a display while allowing edge portions of the display to remain flexible.

With one suitable arrangement, which is illustrated in connection with FIGS. 6, 7, 8, and 9, a rigid display with flexible edges may be formed by removing rigid edge portions of rigid display substrate layers so that underlying flexible edge portions of the display protrude outwards from central rigid display region.

Figure 6:
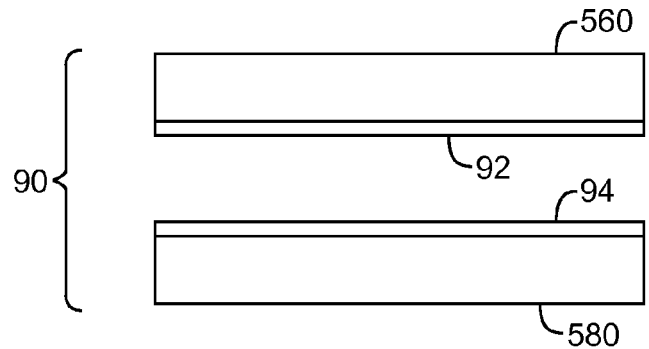
FIG. 6 is a cross-sectional side view of a pair of display layer substrates such as a color filter layer substrate and a thin-film-transistor layer substrate for a display in accordance with an embodiment of the present invention.

As shown in FIG. 6, display layers 90 for forming display 14 may initially include a pair of rigid substrate layers such as substrate layers 560 and 580. Polymer layers such as polymer layers 92 and 94 may be formed on the surfaces of substrate layers 560 and 580 using deposition techniques such as spraying, spinning, dripping, pad printing, screen printing, roller-based liquid resin dispensing, lamination, or other suitable polymer deposition techniques. The polymer materials that are used in forming polymer layers 92 and 94 may be materials that can be formed into thin flexible sheets such as polyimide or other flexible polymers.

Substrate layers 560 and 580 may be formed from sheets of glass or other rigid transparent substrate materials. The hardness of the material used in forming layers 560 and 580 (e.g., the hardness of the glass or other material used in forming layers 560 and 580) may be greater than the hardness used in forming polymer layers 92 and 94 (e.g., the hardness of the polyimide or other polymer used in forming layers 92 and 94). For a given thickness, layers 560 and 580 may also be more rigid than display layers such as polymer layers 92 and 94.

Substrate layer 560 may be used in forming a color filter layer and may therefore sometimes be referred to as a color filter layer substrate. Substrate 580 may be used in forming a thin-film-transistor layer and may therefore sometimes be referred to as a thin-film-transistor layer substrate. Layers 560 and 580 and layers 92 and 94 may have thicknesses in the range of 0.05 to 3 mm (as examples).

Figure 7:
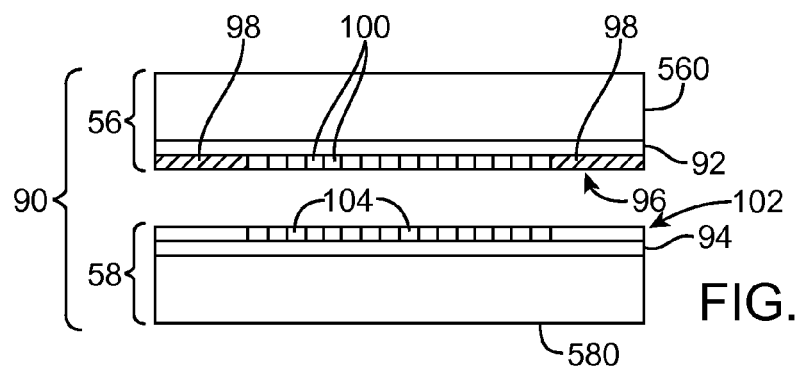
FIG. 7 is a cross-sectional side view of the illustrative pair of display layer substrates of FIG. 6 following formation of color filter elements and a layer of thin-film transistor circuitry in accordance with an embodiment of the present invention.

Following formation of polymer layers 92 and 94 on the inner surfaces of substrate layers 560 and 580, layer 560 may be processed to form a color filter layer and layer 580 may be processed to form a thin film transistor layer. As shown in FIG. 7, for example, color filter elements 100 and opaque masking material structures 98 may be formed on the inner surface of polymer layer 92. Color filter elements 100 may be formed from colored polymer elements (e.g., red, blue, and green dyed polymeric elements arranged in a rectangular array). Color filter elements may be used in providing the active area (AA) of display 14 with the ability to display color images.

Opaque masking structures 98 may be formed from an opaque material such as black ink (e.g., a polymer that includes a material such as carbon black or a dye that is opaque to visible light) and may therefore sometimes be referred to as black masking material or black mask. Black mask 98 may be formed in strip that surrounds the rectangular periphery of the active area of display 14. The use of black mask 98 may help hide internal structures in device 10 from view from the exterior of device 10. Black mask material (sometimes referred to as black matrix material) may also be interspersed among color filter elements 100 (e.g., in the form of a grid).

Structures for thin-film transistor circuitry 102 may be formed on polymer layer 94 on the upper surface of thin-film-transistor layer substrate. Thin-film transistor circuitry 102 may include display pixel electrodes, thin-film transistors, gate lines, data lines, and other circuitry for forming an array of display pixels such as display pixels 104. Display pixels 104 may be aligned with corresponding color filter elements 100 on color filter layer 56. Gate driver circuitry may also be formed in thin-film transistor circuitry 102.

If desired, configurations for display 14 in which thin-film-transistor layer 58 is formed above color filter layer 56 and/or in which color filter elements and thin-film-transistor display pixel structures are formed on a common substrate may be used. Arrangements in which color filter layer 56 is formed above thin-film-transistor layer 58 and in which color filter elements 100 and thin-film-transistor display pixels 104 are formed on separate substrates are sometimes described herein as an example.

Figure 8:
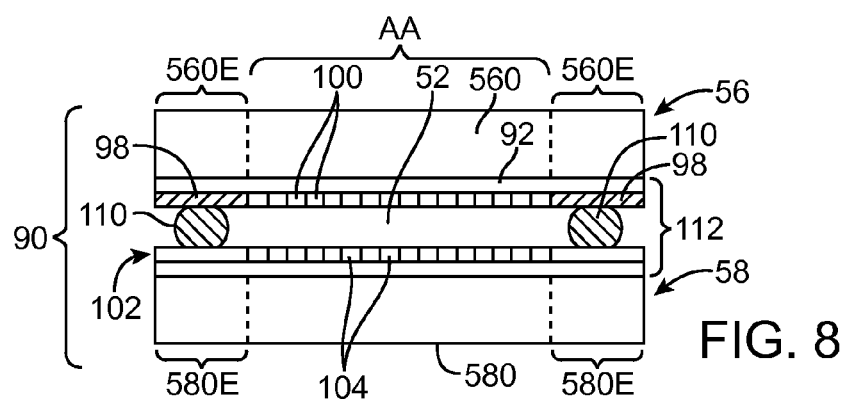
FIG. 8 is a cross-sectional side view of an illustrative display structure in which a color filter layer and thin-film-transistor layer have been attached to each other to form a liquid crystal display in accordance with an embodiment of the present invention.

Following formation of color filter layer 56 by depositing and patterning color filter elements 100 and black masking border 98 on polymer layer 92 on substrate layer 560 and following formation of thin-film-transistor layer 58 by depositing and patterning thin-film-transistor circuitry 102 (e.g., thin-film-transistor display pixels 104 and other display structures) on polymer layer 94 on substrate 580, display structures 90 of FIG. 8 may be formed. In particular, sealant 110 may be used to surround and enclose liquid crystal material 52 between color filter layer 56 and thin-film-transistor layer 58. Sealant 110 may be formed from a bead of polymer resin that runs around the rectangular periphery of the display layers of FIG. 8. Sealant 110 may laterally confine liquid crystal 52 and may help define and maintain a desired vertical spacing between the opposing inner surfaces of color filter layer 56 and thin-film-transistor layer 58.

As shown in FIG. 8, sealant 110 and some or all of black mask border region 98 may be formed in inactive edge portions of display structures 90 outside of active area AA. Because structures 90 of FIG. 8 includes rigid substrates 560 and 580, flexible display structures such as polymer layers 92 and 94, color filter elements 100, black mask 98, and thin-film-transistor circuitry 102 (collectively flexible display layers 112) will be supported by rigid material and will not bend significantly in the configuration of FIG. 8.

To allow flexible display layers 112 to bend (e.g., to reduce the portion of the inactive border of display 14 that extends laterally outwards from rigid active area AA), edge portions of the rigid substrate layers may be removed (e.g., using wet etching, dry etching, scribing and breaking, or other suitable material removal schemes). For example, edge portions 560E may be removed from color filter layer substrate 560 and edge portions 580E may be removed from substrate 580.

Figure 9:
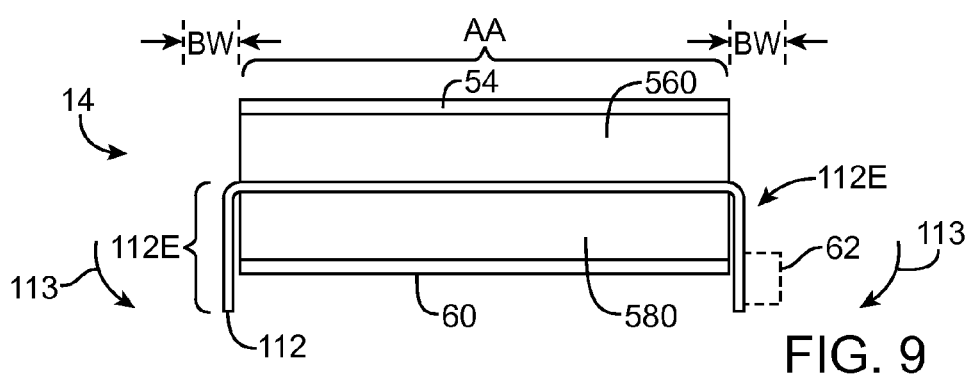
FIG. 9 is a cross-sectional side view of a liquid crystal display having a rigid active area and flexible edges formed by removing some of the substrate materials of FIG. 8 in accordance with an embodiment of the present invention.

As shown in FIG. 9, the rigid glass portions of substrates 560 and 580 that are removed from flexible display layers 112 may be discarded to form a display having protruding flexible edge portions 112E. Upper polarizer 54 may be formed on the upper surface of substrate 560 and lower polarizer 60 may be formed on the lower surface of substrate 580. Flexible edge portions 112E may be formed along one or more of the four peripheral edges of rectangular display 14, may be formed along two or more peripheral edges (e.g., left and right edges or upper and lower edges), or may be formed on three or more or four or more edges of display 14. To minimize the size of border width BW of the inactive portions of display 14 and device 10 outside of active area AA, flexible portions 112E of flexible display layers 112 may be bent downwards out of the plane of the display that contains rigid substrates 560 and 580. As shown in FIG. 9, for example, flexible edge portions 112E of flexible display layers 112 may be bent downwards at a right angle with respect to the plane of substrates 560 and 580. A minimum bend radius of 0.1 mm, greater than 0.1 mm, 0.1 mm to 1 mm, or less than 1 mm may be used to ensure that flexible display layers 112 are not damaged by the bend.

Driver circuitry 62 may be mounted on a bent edge portion of display 14 such as the right-hand bent edge portion 112E of FIG. 9 or may be mounted on a separate substrate such as a substrate associated with a flexible circuit cable (as examples).

Even when display portions such as display edge portions 112E of display 12 are bent at an angle of 30° or more, 70° or more, or 90° or more with respect to the plane of display 14, signals may be routed from external control circuitry such as display driver integrated circuit 62 (FIG. 5) to display pixels 104 using conductive lines such as gate lines and data lines that traverse the bent portion of flexible edges 112E.

Figure 10:
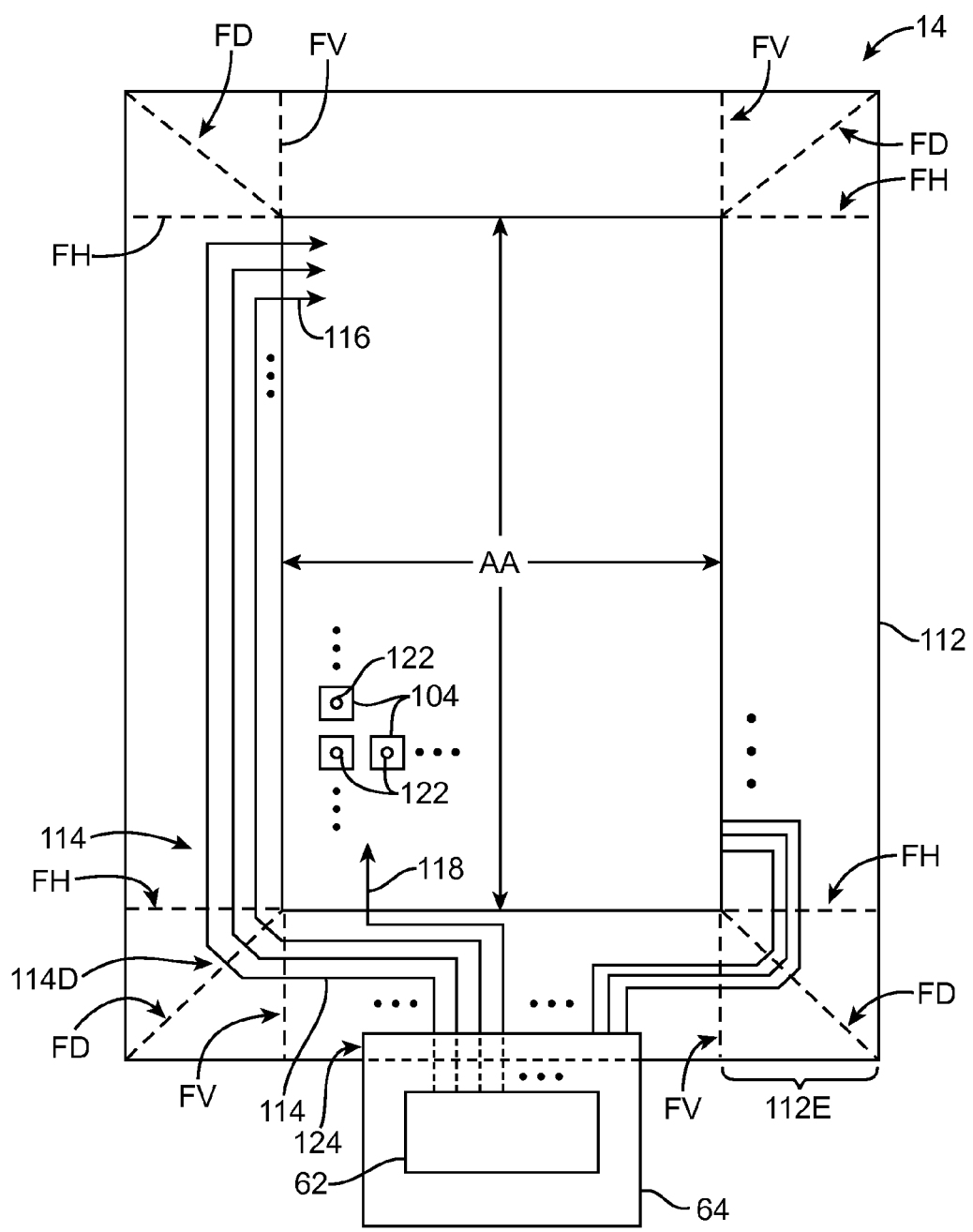
FIG. 10 is a top view of an illustrative display with a rigid active area and flexible edges showing how display traces may traverse both the rigid active area and the flexible edges in accordance with an embodiment of the present invention.

FIG. 10 is a top view of display 14 showing an illustrative configuration that may be used for display 14 when flexible edges 112E are to be bent. As shown in FIG. 10, display pixels 104 may be arranged in a rectangular array of rows and columns in active area AA of display 14.

Each display pixel 104 may include electrode structures and thin-film transistor structures such as thin-film transistors 122. Thin-film transistors in display 14 such as transistors 122 may be formed from polycrystalline or amorphous semiconductors such as polysilicon, amorphous silicon, indium gallium zinc oxide other oxide semiconductors, or other semiconductor materials.

Display pixels 104 may be supplied with data signals over data lines 118. The gates of the transistors in display pixels 104 may be controlled by gate line control signals that are provided to display pixels 104 over gate lines 116.

Conductive lines 114 may be used to route signals to conductive lines such as data lines 118 and gate lines 116 from control circuitry such as display driver integrated circuit 62 or other display driver circuitry. Lines 114 may be formed from metal traces (e.g., aluminum lines, copper lines, traces formed from two or more metals, etc.), traces of indium tin oxide, or other conductive materials.

Display driver integrated circuit 62 may be mounted on edge region 112E of flexible display layers 112 or may be mounted on a separate substrate such as substrate 64. Substrate 64 may be a rigid printed circuit board or a flexible printed circuit such as a flexible printed circuit formed from a sheet of polyimide or other flexible layer of dielectric material. Substrate 64 may contain conductive lines that mate with conductive lines 114 at connection 124. Connection 124 may be formed using anisotropic conductive film that is interposed between lines 114 and the mating lines on substrate 64 or may be formed from other conductive structures (welds, board-to-board connectors, etc.).

Flexible edge portions 112E of flexible display layers 112 may be bent along the dashed lines of FIG. 10 such as horizontal fold lines FH, vertical fold lines FV, and diagonal fold lines FD. To help prevent lines 114 from becoming damaged during the bending process, it may be desirable to orient lines 114 so that each line 114 crosses the fold lines perpendicular to the fold lines, as shown in FIG. 10. Lines 114 may, for example, include diagonal portions such as diagonal segments 114D that run perpendicular to diagonal fold lines FD. Horizontal line segments may be used to cross vertical fold lines FV and vertical line segments may be used to cross horizontal fold lines FH.

Figure 11:
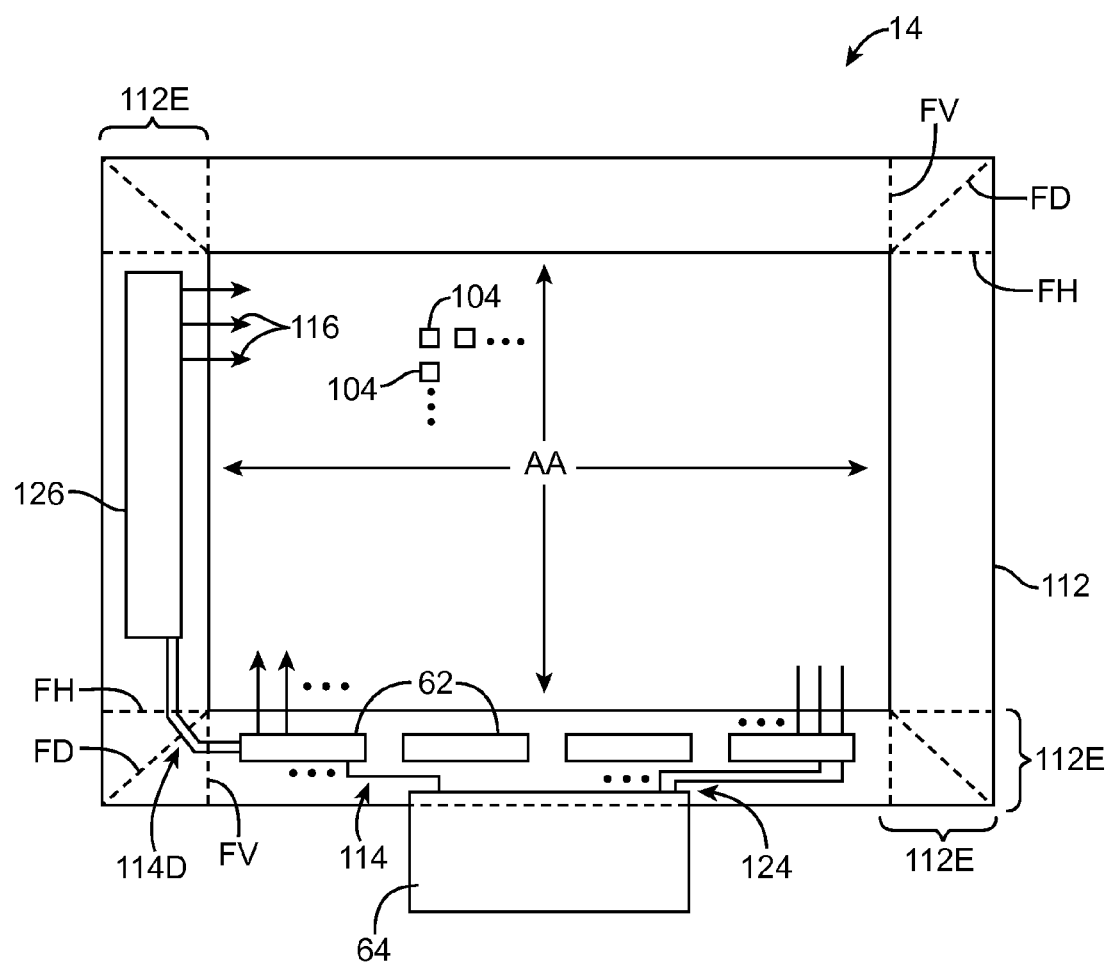
FIG. 11 is top view of a display with a rigid active area and flexible edges having gate driver circuitry mounted on the flexible edges in accordance with an embodiment of the present invention.

FIG. 11 is a top view of display 14 in a configuration in which multiple integrated circuits 62 are being used to implement display driver circuitry for display 14. Display 14 of FIG. 11 includes thin-film transistor circuitry on flexible display layer edges 112E such as gate driver circuitry 126. Gate driver circuitry 126 may include a column of gate driver circuits. Each gate driver circuit may be used in asserting a gate line control signal for a respective row of display pixels 104. Each gate driver circuit may, for example, include a respective gate driver having an output coupled to a respective one of gate lines 116. Gate driver circuitry 126 may be formed along one or more edges of display 14. For example, gate driver circuitry 126 may be formed along left flexible edge strip 112E of flexible display layers 112 or may, if desired, be formed on opposing display edges such as opposing right and left (or upper and lower) display edges.

Signals for controlling display 14 may be routed to display driver integrated circuits 62 using a bus structure such as cable 64. Cable 64 may be a flexible printed circuit with metal traces coupled to conductive lines 114 on flexible display layers 112. If desired, one or more display driver integrated circuits may be formed on cable 64.

If desired, display 14 may be provided with touch sensor capabilities. As an example, a substrate layer such as layer 560, layer 580, one of the other layers in flexible display layers 112, or an additional layer or layers of display 14 may form a transparent dielectric substrate on which an array of capacitive touch sensor electrodes is formed.

Figure 12:
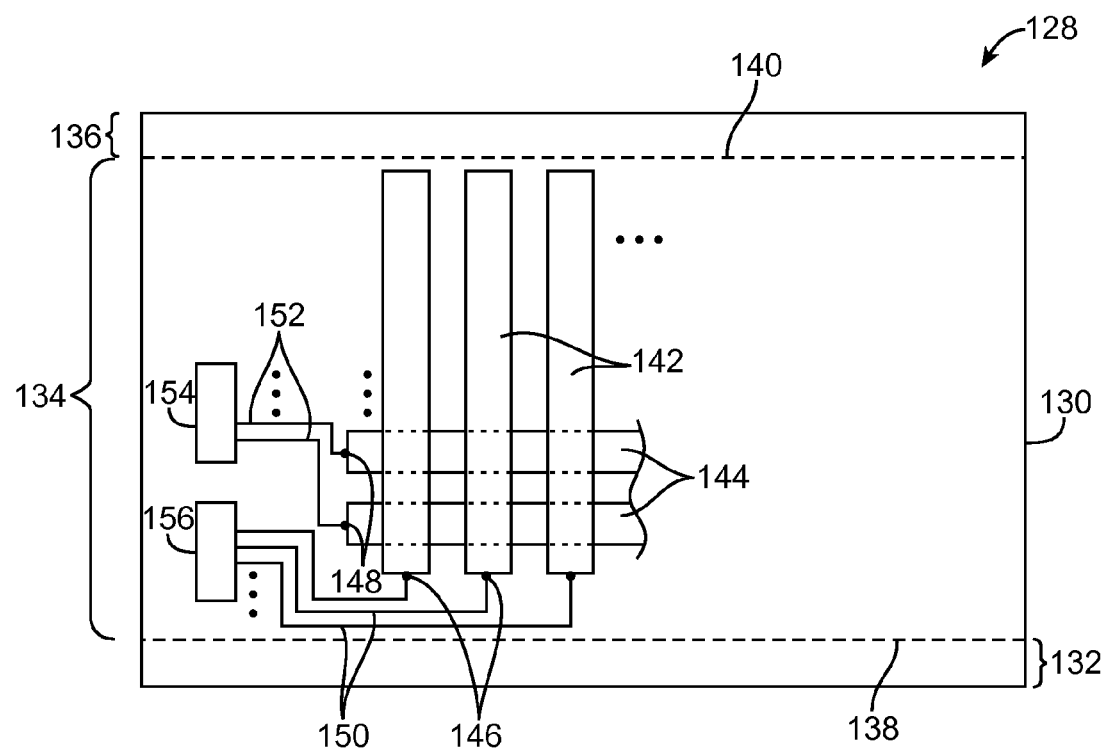
FIG. 12 is a top view of an illustrative touch sensor array with bent edge structure of the type that may be incorporated into a display with bent edges in accordance with an embodiment of the present invention.

FIG. 12 is a top view of an illustrative touch sensor of the type that may be incorporated into layer 560, layer 580, one of the other layers in flexible display layers 112, or an additional layer or layers in display 14. As shown in FIG. 12, touch sensor 128 may be formed from an array of patterned transparent capacitor electrodes such as electrodes 142 and 144. Electrodes 142 and 144 may form an active portion of touch sensor 128 and may be configured to overlap active area AA of display 14 (e.g., by incorporating the structures of FIG. 12 in layers 112 of display 14 and/or by overlapping touch sensor 128 with the thin-film-transistor layer and color filter layer.

Electrodes 142 and 144 may be formed from a transparent conductive material such as indium tin oxide and may be formed on one or both sides of a flexible clear polymer substrate such as flexible substrate 130. Each electrode (in a configuration of the type shown in FIG. 12) may have an elongated rectangular shape that runs across substrate 130. In the FIG. 12 example, electrodes 142 run vertically between the upper and lower edges of substrate 130 and electrodes 144 run horizontally between the right and left edges of substrate 130. Other types of electrode patterns may be used if desired (e.g., linked pads having square or diamond shapes). A layer of dielectric (e.g., layer 130 or other dielectric material) may be interposed between electrodes 142 and electrodes 144.

During operation, electrodes 142 may serve as drive electrodes and electrodes 144 may serve as sense electrodes. A signal such as an alternating current drive signal may be imposed on each drive electrode 142 using one of conductive lines 152. Conductive lines 152 may each have one end that is connected to a terminal in driver line connector 154 and may have an opposing end that is connected to one of terminals 148 on the end of a respective one of drive electrodes 144. With this arrangement, each driver line 152 may be connected to only one single end of a respective capacitive electrode. Sense lines 150 may likewise each have one end that is connected to a terminal in sense line connection 156 and may each have an opposing end that is connected to only a single end of a respective sense electrode.

The use of single-ended connections for forming the connection between each conductive line in touch sensor 128 and its associated capacitive electrode may help reduce the number of conductive lines 152 and 150 on touch sensor 128. For example, a single-ended connection arrangement may make it possible to run conductive lines along only one side of the display rather than along opposing sides of the display to contact opposing ends of the electrodes. As a result, there need only be a single fold in touch sensor substrate 130 along the inactive side of the touch sensor that contains the conductive lines. The portion of the sensor that includes the drive line and sense line connectors (e.g. to attach external flexible printed circuit cables or other signal paths) may be formed in an inactive portion of display 14 that is not bent. This portion of the display may be located, for example, at the upper or lower end of an elongated display in configuration in which it is desired to minimize the inactive borders on the left and right edges of the display that extend between the upper and lower ends.

By minimizing the number of bends in the touch sensor, touch sensor reliability may be enhanced. If desired, double-ended connections may be made (e.g., connections in which each end of each capacitive electrode is coupled to a respective conductive line). Lines 152 and 150 may be formed on the same side of substrate 130 (using vias to connect one of these sets of lines to rear-surface capacitive electrodes) or lines 152 and 150 may be formed on opposing surfaces of substrate 130 (using vias to route one of these sets of lines from the front to the rear surface of substrate 130).

Connections 154 and 156 may be formed by attaching mating signal lines to lines 152 and 150 using anisotropic conductive film, using welds, using solder connections, or using connectors such as board-to-board connectors.

To minimize the inactive border region of display 14, it may be desirable to bend flexible substrate 130 of touch sensor 128 along one or more edges of substrate 130, along two or more edges of substrate 130, or one three or more or four or more edges of substrate 130. As an example, substrate 130 may be bent along fold line 138 so that edge portion 132 of substrate 130 is folded down and out of the plane of touch sensor electrodes 142 and 144 (e.g., out of the plane of planar central portion 134 of touch sensor 128 and/or optional fold line 140 (e.g., in a double-ended connection scheme) so that edge portion 136 is folded down and out of the plane of touch sensor electrodes 142 and 144 (e.g., out of the plane of touch sensor 128).

Figure 13:
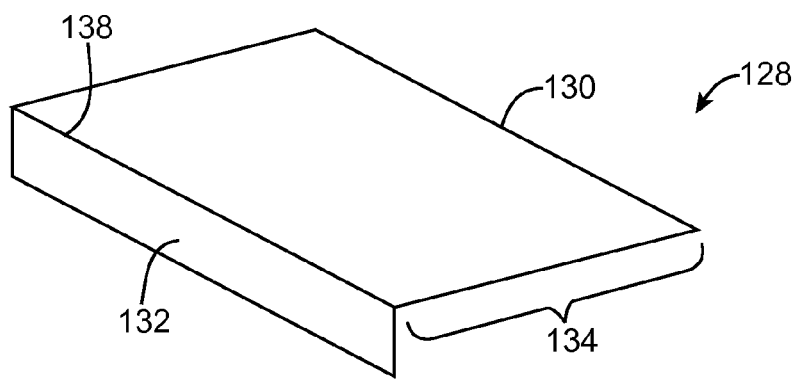
FIG. 13 is a perspective view of an illustrative touch sensor with a bent edge in accordance with an embodiment of the present invention.

In the illustrative configuration for touch sensor 128 that is shown in the perspective view of touch sensor 128 of FIG. 13, single edge portion 132 of substrate 130 and touch sensor 128 has been bent downward at a right angle with respect to planar portion 134 along bend axis 138. The process of folding edge portion 132 downwards and out of the plane of the touch sensor array may help reduce the lateral size of touch sensor 128, thereby helping to minimize the inactive border region of display 14. Planar portion 134 of touch sensor 128 contains capacitive touch sensor electrodes 142 and 144 and therefore preferably overlaps active area AA of display 14. Inactive touch sensor edges such as edge 132 need not contain capacitive touch sensor electrodes 142 and 144 and may therefore not be placed on top of active area AA of display 14. If desired, display 14 may contain touch sensor electrodes that run along one or more of the sides of device 10 (e.g., to form virtual buttons on one or more sidewalls of device 10). The illustrative configurations of touch sensor 128 that are shown in FIGS. 12 and 13 are merely illustrative.

The foregoing is merely illustrative of the principles of this invention and various modifications can be made by those skilled in the art without departing from the scope and spirit of the invention.

What is claimed is:

1. A display, comprising:
   first and second glass substrate layers; and
   display layers interposed between the first and second glass substrate layers, wherein the display layers include a liquid crystal display layer, first and second polymer layers, color filter elements, and thin-film-transistor circuitry, wherein the color filter elements and thin-film-transistor circuitry are interposed between the first and second polymer layers, wherein the display layers have an active area containing display pixels and have an inactive area, wherein the active area is located between the first and second glass substrate layers, and wherein at least one of the polymer layers protrudes outwardly from between the first and second glass substrate layers and has a bend.

2. The display defined in claim 1 wherein the color filter elements are formed on the first polymer layer.

3. The display defined in claim 1 wherein the first and second polymer layers comprise polyimide.

4. The display defined in claim 1 further comprising thin-film-transistor gate driver circuitry, wherein the thin-film-transistor gate driver circuitry is formed on a portion of the polymer layer that protrudes outwardly from between the first and second glass substrate layers.

5. The display defined in claim 1 wherein the color filter elements are formed on the first polymer layer, the display further comprising:
   a black mask border on the first polymer layer; and
   an array of display pixels each of which contains a thin-film-transistor on the second polymer layer.

6. The display defined in claim 5 wherein the thin-film-transistors include indium gallium zinc oxide transistors.

7. The display defined in claim 1 further comprising:
   an array of display pixels on the second polymer layer; and
   conductive lines on the second polymer layer, wherein the conductive lines include gate lines and data lines.

8. The display defined in claim 7 wherein the display layers are bent along at least one horizontal fold line, at least one vertical fold line, and at least one diagonal fold line and wherein the conductive lines include at least one conductive line segment that runs perpendicular to the diagonal fold line.

9. The display defined in claim 1 further comprising at least one display driver integrated circuit, wherein the display driver integrated circuit is mounted to the second polymer layer within the inactive area.

10. The display defined in claim 1 further comprising:
    at least one display driver integrated circuit; and
    a flexible printed circuit substrate on which the display driver integrated circuit is mounted.

11. The display defined in claim 10 wherein the flexible printed circuit is coupled to conductive lines on the second polymer layer.

12. The display defined in claim 11 wherein the second polymer layer includes an array of display pixels and gate lines and data lines in the conductive lines that distribute signals from the display driver integrated circuit to the display pixels.

13. An electronic device, comprising:
- a housing having a rectangular front face with opposing upper and lower edges and opposing left and right edges;
- a glass color filter layer substrate;
- a glass thin-film-transistor layer substrate; and
- display layers interposed between the glass color filter layer substrate and the glass thin-film-transistor layer substrate, wherein the display layers include color filter elements and thin-film-transistor circuitry interposed between first and second polymer layers, wherein the polymer layers include a flexible left inactive edge portion that extends outwards from between the glass color filter layer substrate and the glass thin-film-transistor layer substrate along the left edge of the housing and include a flexible right inactive edge portion that extends outwards from between the glass color filter layer substrate and the glass thin-film-transistor layer substrate along the right edge of the housing.

14. The electronic device defined in claim 13 wherein the flexible left inactive edge portion has a right-angle bend and wherein the flexible right inactive edge portion has a right-angle bend.

* * * * *